C. SHORMAN.
PROCESS OF AND APPARATUS FOR DEHYDRATING FRUITS, VEGETABLES, &c.
APPLICATION FILED JUNE 4, 1913.
1,324,072.
Patented Dec. 9, 1919.
3 SHEETS—SHEET 1.
Fig. 1.
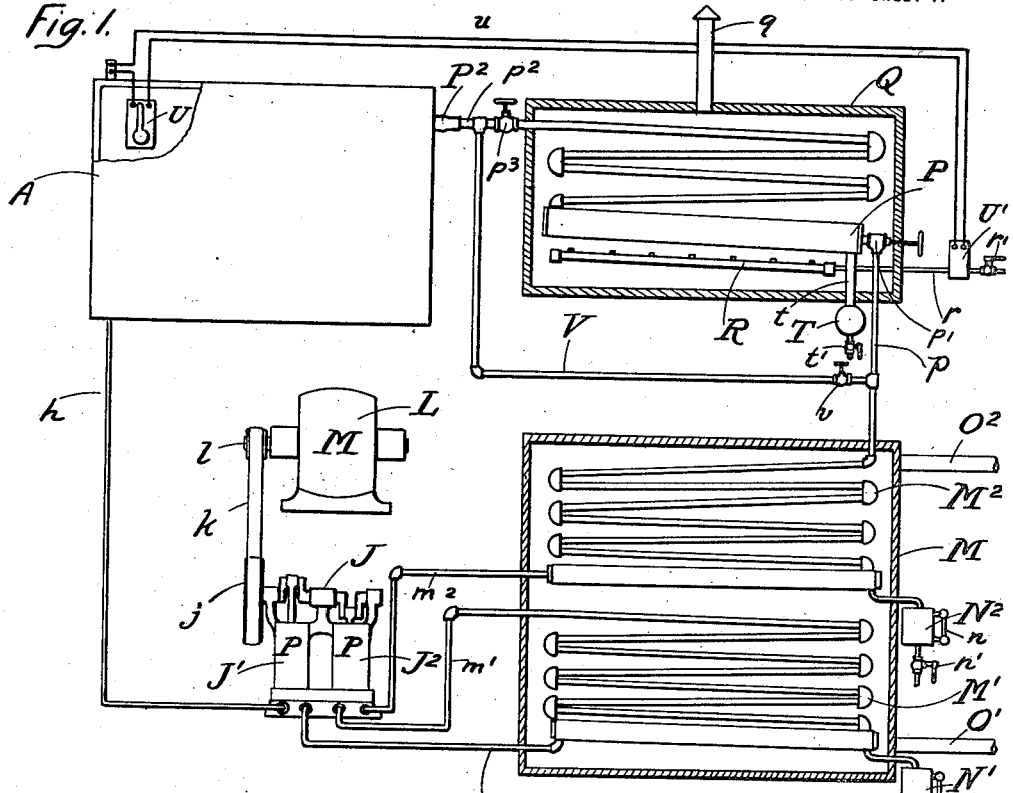
Fig. 8.
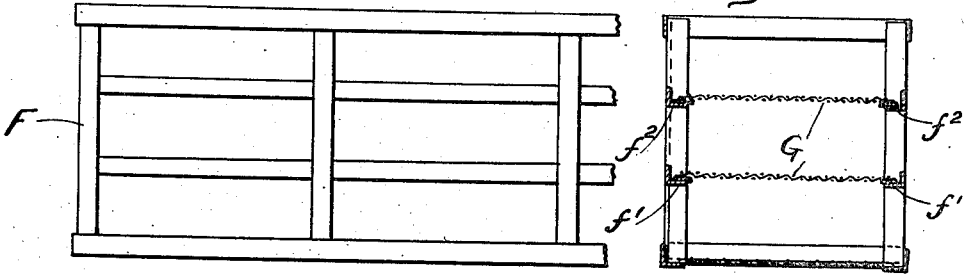
Fig. 9.
Fig. 10.
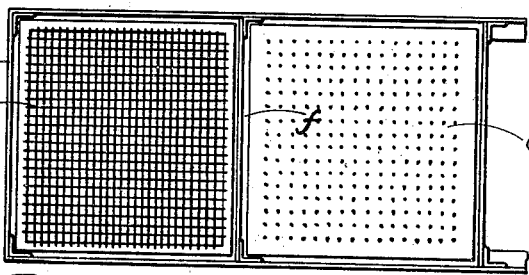
Witnesses:
C. W. Burnap
Henry A. Parke
Inventor:
Chauncey Shorman
By Sheridan, Wilkinson, Scott & Richmond Attys

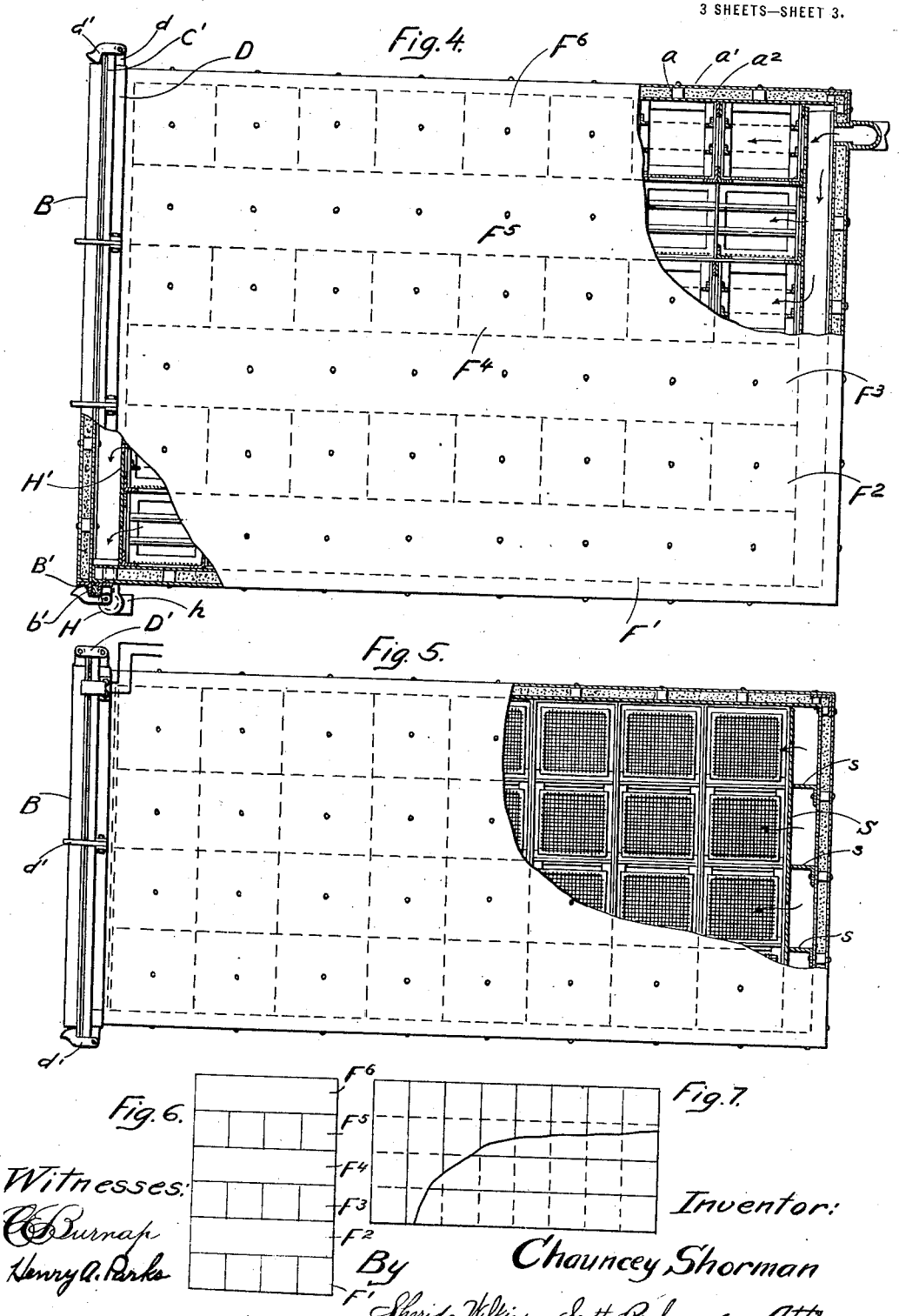

UNITED STATES PATENT OFFICE.

CHAUNCEY SHORMAN, OF CHICAGO, ILLINOIS.

PROCESS OF AND APPARATUS FOR DEHYDRATING FRUITS, VEGETABLES, &c.

1,324,072. Specification of Letters Patent. Patented Dec. 9, 1919.

Application filed June 4, 1913. Serial No. 771,777.

*To all whom it may concern:*

Be it known that I, CHAUNCEY SHORMAN, a citizen of the United States, residing at Chicago, in the county of Cook and State of Illinois, have invented certain new and useful Improvements in Processes of and Apparatus for Dehydrating Fruits, Vegetables, &c., of which the following is a specification.

My invention relates in general to dehydration of fruits, vegetables, and similar food articles, and more particularly to an improved process of dehydration, and also to an apparatus for practising my process.

In order to economically transport perishable articles of food, such as fruits and vegetables, from the localities where they are grown to distant places of consumption, it is desirable to extract all moisture from the articles, thereby preserving them from decomposition during transportation, and reducing their size and weight so as to lessen the expense of transportation. The consumer before using the articles places them in water so as to restore them, as far as possible, to their natural condition. The objection to this treatment of food articles is that the methods heretofore practised in removing the water have also removed the flavor of the articles so that when they are hydrated by the consumer they are not restored to their original natural condition.

The primary object of my invention is to provide a process for dehydrating food articles, such as vegetables, fruits, etc., by the practice of which the articles will retain their original flavor so that when again hydrated they will be restored substantially to the same condition they were in before being dehydrated.

A further object of my invention is to provide an improved apparatus for dehydrating food articles, such as vegetables, fruits, etc., by means of which the articles may have all moisture extracted from them without also extracting their characteristic flavors.

My invention will be more fully disclosed hereinafter with reference to the accompanying drawings in which the same is illustrated as embodied in a convenient and practical form, and in which—

Figure 2:
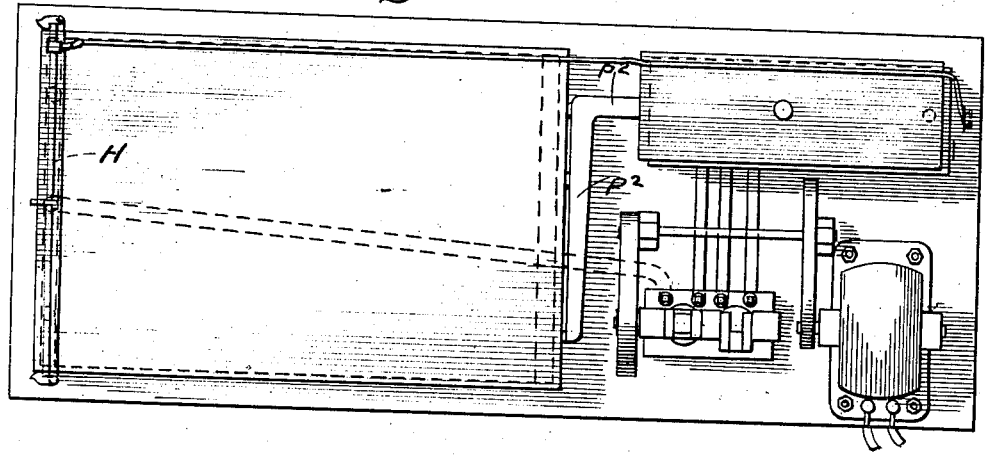
Figure 3:
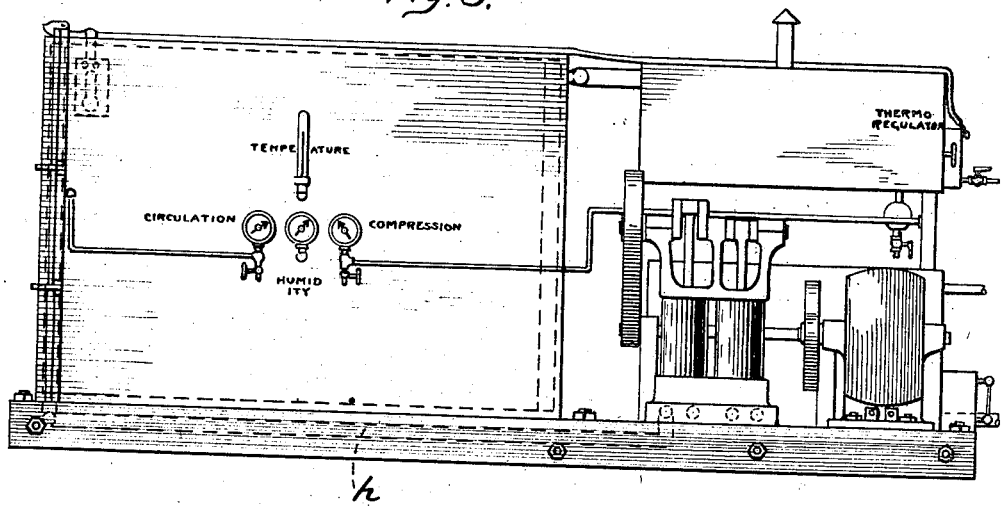

Figure 1 is a somewhat diagrammatic view of my improved apparatus, portions thereof being shown in elevation, and other portions in vertical section;

Fig. 2 a plan view of the apparatus;

Fig. 3 a side elevational view;

Fig. 4 a side elevational view of the receptacle in which the articles to be treated are placed, portions being broken away;

Fig. 5 a plan view of the containing receptacle, a portion thereof being broken away;

Figs. 6 and 7 end and plan views diagrammatically illustrating the arrangement of the crates within the receptacle for holding the articles to be treated;

Fig. 8 a side elevational view of a portion of one of the crates;

Fig. 9 a vertical cross section of one of the crates; and

Fig. 10 a plan view of a portion of one of the crates showing the foraminous trays for supporting the articles.

Similar reference characters are used to designate similar parts in the several figures of the drawings.

A designates a receptacle for containing the articles to be dehydrated. Inasmuch as this receptacle must be hermetically sealed and must be capable of withstanding a considerable external pressure, it is desirable it should possess considerable structural strength which may be conveniently imparted to it by making its walls of two thicknesses of metal plates, such as indicated by reference characters $a^1$ and $a^2$. These plates are spaced apart by interposed thimbles $a$ through which bolts or rivets pass. The receptacle is provided with one removable wall through which access may be had to the interior thereof, such wall being preferably one of the vertical ends of the receptacle, such as indicated by B. The end wall B is provided with an angle strip B' around the periphery thereof, the outwardly projecting flange $b'$ of which lies adjacent a stop strip C' surrounding the adjacent end of the receptacle A. One vertical edge of the removable end wall B is pivotally connected in any suitable manner to the adjoining fixed wall of the receptacle, as by means of links D' pivotally connected at its opposite ends to lugs secured to the removable wall and adjoining stationary wall of the receptacle, as shown in Fig. 5. The removable wall or door B is retained in closed position by means of latches $d'$ pivotally connected to lugs $d$ projecting from a band D extending around the end of receptacle A. The latches $d'$ are provided with hooks which engage the flange $b'$ and clamp the same tightly against the band $C'$. In order to hermetically close the joint between the removable wall B and the fixed walls of the receptacle, any suitable packing material may, if desired, be inserted between the contacting surfaces of the removable wall and stationary walls of the receptacle.

In order that the receptacle A may be capable of withstanding the inward pressure of the atmosphere when the pressure within the receptacle is below that of the atmosphere, I preferably provide removable crates which contain the articles to be treated and which at the same time are so placed within the receptacle as to constitute interior braces. Each of the crates F is preferably formed of strips of metal and angle bars, as clearly shown in Figs. 8, 9 and 10. The crates are formed in two lengths, one length corresponding to the interior width of the receptacle A, and the other length corresponding to the interior length of the receptacle. The longer of the crates are arranged side by side lengthwise within the receptacle, as indicated at $F'$ in Fig. 4. A layer $F^2$ of the shorter crates is then placed upon the first layer $F'$. Upon the layer $F^2$ is placed a layer $F^3$ of the longer crates. This arrangement is continued so that the several layers of crates completely fill the interior of the receptacle and strongly brace the walls of the receptacle.

Before placing the crates within the receptacle A they are filled with the particular fruit or vegetable, or other substances, which is to be dehydrated. Inasmuch as it is necessary that the articles should be exposed on all sides to the dry air within the receptacle A, a number of foraminous trays G are supported within each case, as by means of pairs of angle bars $f'$ and $f^2$, as shown in Fig. 9. The trays may be formed of wire fabric secured to a frame, as shown in Fig. 9 and at the left of Fig. 10, or such trays may comprise perforated sheets of metal, as shown in $G'$ in Fig. 10.

H designates a pipe located beneath one end of the receptacle A, as for instance adjacent the removable wall B thereof. This pipe communicates at a plurality of points, as indicated in Fig. 2, with the interior of the receptacle. In order that the air within the receptacle may freely pass through the openings to the pipe H, a space is preferably left between the crates and the wall B, as shown in Fig. 4. $H'$ designates a perforated removable wall against which the crates bear and which is suitably braced against the inner surface of the wall B, as shown in Fig. 4. A conduit $h$ communicates with the pipe H, and leads to the inlet of an air compressor $J'$. The air compressor $J'$, as well as a second air compressor $J^2$, may be operated in any suitable manner, as by means of a crank shaft J, operatively rotated by any suitable motor or engine L. The motor or engine may be connected to the shaft J by any power transmitting means, such for instance as the belt $k$ passing around the pulley $j$ fixed to the crank shaft J, and around a pulley $l$ fixed to the motor or engine shaft.

The outlet of the compressor $J'$ communicates through a conduit $m$ with a series of condensing coils $M'$. The condensing coils $M'$ communicate through a pipe $m'$ with the inlet of the second compressor $J^2$. The outlet of compressor $J^2$ communicates through a pipe $m^2$ with a second series of condensing coils $M^2$ which may conveniently be located above the first series of condensing coils $M'$. The condensing coils are located within a tank M containing water through which the condensing coils extend and by which they are cooled. The water is supplied to the tank M through a conduit $O'$ from any suitable source. $O^2$ designates an overflow conduit leading from the tank M at a level above the condensing coils therein.

A trap $N'$ communicates with the lower of the series of condensing coils $M'$ into which any water of condensation flows from such coils. The trap $N'$ is preferably provided with a glass gage $n$ for indicating the amount of water collected therein. $n'$ designates an outlet valve for permitting the discharge of water from the trap $N'$. A similar trap $N^2$ communicates with the bottom of the second series of condensing coils $M^2$, such trap being also provided with a glass gage $n$ and an outlet valve $n^2$.

The second series of condensing coils $M^2$ communicates through a pipe $p$ with a series of coils P located within a heater Q. $p'$ designates a valve for controlling the passageway from the pipe $p$ into the enlarged bottom coils of the series P in the heater. R designates a burner located beneath the coils P. $r$ designates a conduit through which gas is supplied to the burner R, the passage of gas through such conduit being controlled by the valve $r'$. $q$ designates a vent opening leading from the top of the heating chamber Q.

The upper one of the series of heating coils P communicates through a pipe $p^2$ and coupling $P^2$ with the interior of the receptacle A, a space being preferably left between the crates within the receptacle and the wall through which the coupling $P^2$ extends, as shown in Fig. 4. This space is provided by means of a perforated plate S bearing against the superimposed crates and spaced from the inner surface of the adjacent wall of the receptacle by suitable braces $s$, as shown in Fig. 5.

A trap T communicates with the heating coils P through a pipe $t$, an outlet valve $t'$ being provided for permitting the escape from the trap of water of condensation which may collect therein.

In order to automatically maintain the temperature in the receptacle A at a predetermined degree, a thermostat U is located in the receptacle which controls a circuit $u$ leading to an electrically controlled valve U' in the fuel supply pipe $r$. The thermostat and valve controlled thereby are not shown in detail as such devices are well known.

As a further means for regulating the temperature within the receptacle A, a by-pass pipe V extends from the pipe $p$ to the pipe $p^2$, such by-pass being controlled by a valve $v$.

The manner of using and operation of my improved apparatus are as follows: The fruit, vegetables, or other articles which are to be dehydrated are placed upon the various trays G and such trays are placed within the crates F. The crates containing the articles to be treated are then arranged within the receptacle A in the manner heretofore described so as to form braces for the walls of the receptacle. After the receptacle has been filled with the crates the removable wall B is closed and tightly clamped in closed position. The compressors are then put into operation. The compressor J' withdraws the air from the receptacle A and with it the moisture from the articles within the receptacle. The air is then forced through the condensing coils M' and M² by the two compressors, and owing to the restricted outlet from the coils through the valve $p'$, the air within the condensing coils is compressed, thereby condensing the moisture which flows from the coils into the traps with which they communicate. The water surrounding the condensing coils serves to keep them cool and dissipate the heat generated by the compression of the air within them. After the moisture has been removed from the air, as it passes through the condensing coils, the air passes into the heating coils P where it is heated to the desired temperature, and then again passes into the receptacle A. By suitably regulating the valve $p'$ and $p^3$ the amount of hot air supplied to the receptacle A may be so regulated that the pressure within the receptacle A will be below that of the atmosphere, and hence the articles contained in the receptacle have the moisture withdrawn from them by suction, and at the same time they are dried by the hot air which circulates through them. The temperature of the hot air supplied to the receptacle may be regulated by controlling the supply of fuel to the burner, or, if desired, the air may be passed through the conduit V from the condensing coils so as to mix with the hot air passing through the receptacle, a predetermined quantity of the air coming directly from the condensing coils. The thermostatically controlled valve prevents the interior of the receptacle becoming so hot as to injure the articles under treatment.

In the use of my improved apparatus, after the articles contained within the receptacle have been sufficiently treated, the wall B is opened and the crates are removed from the receptacle. The trays are removed from the crates and the dehydrated articles thereon are replaced by other articles to be treated. The crates when again charged with articles are placed within the receptacle which is then closed, and the new charge of articles treated in the same manner as above described.

From the foregoing description it will be observed that by my improved process as practised by suitable apparatus, such as that herein illustrated and described, the air which is withdrawn from the treated articles and which is saturated with moisture extracted from them, is, after having the moisture removed therefrom, and after being heated, returned to the articles and is circulated around them so that the flavor of the particular articles under treatment is to a large extent preserved. It will be further observed that by my improved process the same air is continuously circulated through the articles until their treatment has been completed, thereby obviating the absorption by the articles of impurities from the air which would result from merely supplying heated atmospheric air to the articles under treatment.

I claim:

1. In a dehydrating apparatus, the combination with a closed receptacle for containing the articles to be treated, of means for exhausting the air from said receptacle and compressing the exhausted air, means for condensing the moisture in the compressed air, means for heating the said air, and means for returning the dried air to the receptacle.

2. In a dehydrating apparatus, the combination with a closed receptacle for containing the articles to be treated, of means for exhausting the air from said receptacle, means for compressing the said air to condense the moisture therein, means for withdrawing the water of condensation from the said air, means for heating the said air after the elimination of moisture therefrom, and means for returning the heated air to the receptacle.

3. In a dehydrating apparatus, the combination with a closed receptacle for containing the articles to be treated, of a compressor connected with said receptacle for exhausting and compressing the air therefrom, condensing coils connected with said compressor and through which the air withdrawn from said receptacle and compressed is forced, a water tank in which said condensing coils are submerged, means for withdrawing from said condensing coils water condensed from the air forced through them, and means for returning the air from said condensing coils to said receptacle.

4. In a dehydrating apparatus, the combination with a closed receptacle for containing the articles to be treated, of a compressor connected with said receptacle for exhausting and compressing the air therefrom, condensing coils connected with said compressor and through which the air withdrawn from said receptacle and compressed is forced, a water tank in which said condensing coils are submerged, means for withdrawing from said condensing coils water condensed from the air forced through them, a heating coil connected with said condensing coils, means for regulating the flow of air from the condensing coils to the said heating coil, and a conduit connecting said heating coil with said receptacle.

5. In a dehydrating apparatus, the combination with a closed receptacle for containing the articles to be treated, of a compressor operatively connected with said receptacle for withdrawing air therefrom, a series of condensing coils through which the air is delivered from said compressor, a second compressor, the intake of which is connected with said series of heating coils, a second series of condensing coils with which the delivery port of said second compressor is connected, a water tank in which said two series of condensing coils are submerged, a heating coil communicating with said second series of condensing coils, and means for regulating the return of air from said heating coil to said receptacle.

6. In a dehydrating apparatus, the combination with a closed receptacle for containing the articles to be treated, of means for exhausting the air from said receptacle, condensing apparatus through which the said air is forced to eliminate moisture therefrom, a heating coil connected with said condensing apparatus, a burner for said heating coil, a valve controlling the supply of fuel to said burner, means for regulating the return of air from said heating coil to said receptacle, and means for automatically controlling said valve to maintain a predetermined degree of temperature in said receptacle.

7. The process of dehydration by re-use of the air which consists in excluding the articles to be treated from the atmosphere, exhausting the air from around said articles, compressing the said air to condense the moisture therein, eliminating from said air the water of condensation, heating the said air, and subjecting the articles to the said heated air.

8. The process of dehydration, which consists in subjecting the articles to be treated to pressure below that of the atmosphere, withdrawing the air from said articles, removing the moisture from said air, and subjecting the articles to said air after the elimination of the moisture therefrom.

9. In a dehydrating apparatus, the combination with a closed receptacle for containing the articles to be treated, of means for exhausting the air from said receptacle, means for removing the moisture from said air, means for returning the said air to the receptacle after the removal of the moisture therefrom, and regulating means for maintaining the pressure in said receptacle below that of the atmosphere.

10. The process of dehydration, which consists in subjecting the articles to be treated to pressure below that of the atmosphere, withdrawing the air from around said articles, removing the moisture from said air, heating the said air, and subjecting the articles to said same air after the elimination of moisture therefrom and heating the same.

In testimony whereof, I have subscribed my name.

CHAUNCEY SHORMAN.

Witnesses:
   GEO. L. WILKINSON,
   THOMAS F. SHERIDAN.